United States Patent
Juarbe

[11] 3,772,994
[45] Nov. 20, 1973

[54] SHOPPING CART CONTROL SYSTEM

[76] Inventor: Cesar A. Juarbe, 2290 S.W. 2nd Terrace, Miami, Fla. 33135

[22] Filed: Mar. 13, 1972

[21] Appl. No.: 233,876

[52] U.S. Cl............ 104/140, 104/242, 280/33.99 C
[51] Int. Cl.............................................. E01b 5/04
[58] Field of Search.............. 280/33.99 C, 33.99 R; 105/141; 104/1, 118, 139, 140, 141, 146, 242, 244.1, 248

[56] References Cited
UNITED STATES PATENTS
3,265,157  8/1966  Rissler.......................... 280/33.99 C
3,410,223  11/1968  Miller.................................. 104/139
2,575,055  11/1951  Jaeger................................... 104/60

Primary Examiner—Gerald M. Forlenza
Assistant Examiner—D. W. Keen
Attorney—Salvatore G. Militana

[57] ABSTRACT

A shopping cart control system for preventing the theft of shopping carts in which a track mounted on the ground and extends from a store to the automobile parking area. The shopping cart is connected by a chain to a member slidably mounted in the track, but not removable therefrom whereby the shopping cart can only travel along a defined path. The over-all concept comprehends an attachment that lends itself to being mounted on shopping carts currently in use.

2 Claims, 4 Drawing Figures

PATENTED NOV 20 1973 3,772,994
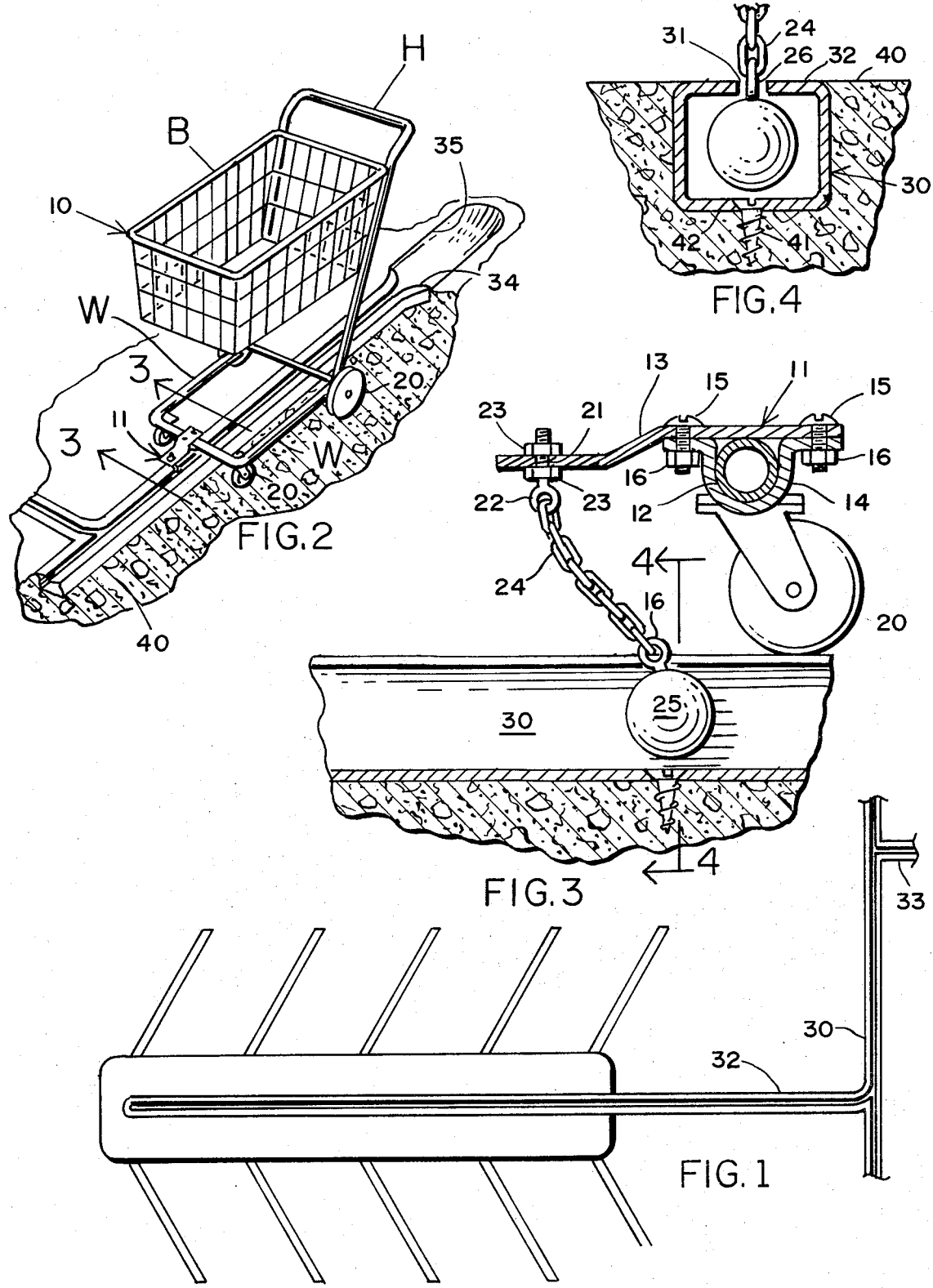

SHOPPING CART CONTROL SYSTEM

BACKGROUND OF THE INVENTION

1. Field of the Invention

This invention relates to a shopping cart and is more particularly directed to a means for preventing the theft and removal of the shopping carts from the store permitting use of the carts.

2. Description of the Prior Art

Considerable losses are being felt by shop owners of grocery stores, department stores, delicatessans and the like that utilize shopping carts due to the theft or unauthorized removal of the carts from the premises or shopping areas. Two methods have been devised to help prevent the theft of shopping carts. In the first method, the area immediately outside the exit to the store is so barricaded that the cart cannot be wheeled outside the barricade. This, of course, defeats the purpose of the cart which is to permit a person to wheel with ease a large quantity of purchased articles to his automobile. The second method is to provide the cart with a mechanism that permits the cart to be wheeled a relatively short distance when a brake automatically takes effect to prevent any further wheeling of the cart. These devices are complicated, expensive and in fact do not prevent the theft of the cart since the cart can be lifted into an automobile or truck and taken away.

SUMMARY OF THE INVENTION

The present invention contemplates avoiding the objections to the present manner of controlling shopping carts against theft and unauthorize removal from a designated area and has for its principal object the provision of a combined track and cart system that permits rolling the shopping cart along a designated area only.

Another object of the present invention is to provide an attachment for the conventional shopping carts that is simple in construction, readily mounted on the cart, inexpensive in cost and which secures the cart to a track so that the cart cannot be removed from a designated area.

A further object of the present invention is to provide a track system that extends from a shop to a parking area and a shopping cart having an attachment slidably mounted therein whereby the cart cannot be removed from the track system while in the parking area.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

BRIEF DESCRIPTION OF THE DRAWING

In the drawing:

FIG. 1 is a plan view of a track system extending to a parking lot for controlling shopping carts for preventing the theft or removal thereof from the shopping area.

FIG. 2 is a perspective view of a shopping cart having mounted thereon an attachement constructed in accordance with my invention and shown in connection with the track system.

FIG. 3 is a cross sectional view taken along the line 3—3 of FIG. 2.

FIG. 4 is a cross sectional view taken along the line 4—4 of FIG. 3.

DESCRIPTION OF THE PREFERRED EMBODIMENT

Referring to the drawing wherein like numerals are used to designate similar parts throughout the several views, the numeral 10 refers to a conventional shopping cart on which is mounted an attachment 11 constructed in accordance with my invention for preventing the theft of the shopping cart 10. Since the attachment 11 may be mounted on any of the conventional shopping carts, the cart 10 which is shown only by way of illustration consists of a frame work constructed from a length of a tubular member bent to form a horizontal wheel support W and a combined handle and basket support H with a basket B supported thereon. Ground engaging wheels 20 support the cart 10 and permit the ready rolling movement of the shopping cart 10. The front rung or tubular cross bar 12 forms a support for my attachment 11 which consists of an extension plate 13 mounted on the mid-portion of the cross member 12 and extending forwardly thereof. A clamp 14 extending over the lower surface of the cross member 12 secures the extension plate 13 to the cross member 12 by bolts 15 and 16 as shown by FIG. 3.

At the forward end portion of the extension plate 13 is a bore 21 for receiving an eye bolt 22 secured thereto by nuts 23. Attached to the eye bolt is a chain 24 which extends downwardly and at whose endmost link there is attached a ball 25 in which is embedded an eyebolt 26. The ball 25 is contained in a tubular track 30 which is provided with a longitudinal slot 31 in the upper wall 32 of the track 30. The chain 24 extends through the slot 31 as shown by FIG. 4 with the ball 25 contained and entrapped within the track 30 and capable only of sliding therealong.

The tracks 30 are embedded in the ground or floor 40 with the top wall 32 approximately flush with the top surface of the floor 40 and with the track 30 secured therein by bolts or screws 41 extending through the bottom wall 42 and into the floor 40.

It is intended that the shopping carts 10 having my attachment 11 and the track system 30 be utilized in that area outside the store or building, but extending therefrom where such carts 10 may be loaded with the purchased articles to permit a person to wheel the cart 10 to his automobile. The conventional shopping carts with not attachements 11 would be used within the store as is done at the present time. Consequently, after the conventional shopping cart has been unloaded at the cashier's counter, the articles that have been purchased are then bagged and transferred to the shopping cart 10, which are then pushed along the track 30 to the parking lot and turns off one of the branch tracks 32, 33 closest to where the person has parked his automobile. The emptied carts 10 are then permitted to remain at the end of the track branches when at the end of the day, an employeee will wheel them back to the store or the start 34 of the track system 30 where there is an opening 35 in the floor 40 permitting access to the track 30 by the ball 25.

From the above discussion taken in connection with the drawing, the carts 10 have the attachments 11 will defeat any possibility of a person stealing the cart or being able to wheel the cart away from the shopping area. So long as the authorities maintain the conventional shopping carts (not including my attachment 11) within the store or shop and permit only the shopping carts 10 with my attachment 11 thereon to leave the shop with the ball 25 slidably mounted in the track system, there can be no theft or loss of shopping carts as exists today in alarming numbers.

I claim:

1. A shopping cart control system for preventing the unauthorized removal of shopping carts from a designated area comprising a shopping cart having rollers and a cross member, clamp means secured to said crossmember having a portion extending forwardly of said cross member, a tubular member mounted along said ground in said area, said tubular member having a longitudinal slot extending along its top wall, slidable means substantially larger than said slot slidably mounted within said tubular member and chain means connecting said slidable means and said extended portion whereby said shopping cart is prevented from being removed from said area.

2. The structure as recited by claim 1 wherein said slidable means comprises a substantially spherical member.

* * * * *